United States Patent
Zhang et al.

(10) Patent No.: US 11,074,466 B2
(45) Date of Patent: Jul. 27, 2021

(54) ANTI-COUNTERFEITING PROCESSING METHOD AND RELATED PRODUCTS

(71) Applicant: GUANGDONG OPPO MOBILE TELECOMMUNICATIONS CORP., LTD., Guangdong (CN)

(72) Inventors: Haiping Zhang, Guangdong (CN); Yibao Zhou, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 31 days.

(21) Appl. No.: 16/625,906

(22) PCT Filed: Jul. 24, 2018

(86) PCT No.: PCT/CN2018/096829
§ 371 (c)(1),
(2) Date: Dec. 23, 2019

(87) PCT Pub. No.: WO2019/024717
PCT Pub. Date: Feb. 7, 2019

(65) Prior Publication Data
US 2020/0167581 A1  May 28, 2020

(30) Foreign Application Priority Data
Jul. 29, 2017  (CN) .......................... 201710634311.7

(51) Int. Cl.
*G06K 9/62* (2006.01)
*G06T 5/00* (2006.01)
*G06K 9/00* (2006.01)

(52) U.S. Cl.
CPC ....... *G06K 9/00892* (2013.01); *G06K 9/0061* (2013.01); *G06K 9/00201* (2013.01);
(Continued)

(58) Field of Classification Search
None
See application file for complete search history.

(56) References Cited

U.S. PATENT DOCUMENTS 9,934,436 B2 * 4/2018 Mears ................ G06K 9/00892
2014/0320491 A1 10/2014 Dai et al.
(Continued)

FOREIGN PATENT DOCUMENTS

CN 101833646 9/2010
CN 102622588 8/2012
(Continued)

OTHER PUBLICATIONS

SIPO, Third Office Action for CN Application No. 201710634311.7, dated Dec. 13, 2019.
(Continued)

*Primary Examiner* — Idowu O Osifade
(74) *Attorney, Agent, or Firm* — Hodgson Russ LLP (57) ABSTRACT

The present application provides an anti-counterfeiting processing method and related products, the method includes acquiring an iris image; acquiring a plurality of face images, the plurality of face images each corresponds to a set of depth information and a respective angle, and the iris image and the plurality of face images are derived from the same target object; performing three-dimensional modeling according to the plurality of face images and the depth information corresponding to the plurality of face images to obtain a stereo face image; comparing the stereo face image with a preset stereo face image, and performing a living body detection according to the iris image; and determining the target object is an effective real face when the stereo face image is successfully matched with the preset stereo face image and the iris image is derived from a living body.

20 Claims, 6 Drawing Sheets

(52) U.S. Cl.
CPC ..... *G06K 9/00255* (2013.01); *G06K 9/00288* (2013.01); *G06K 9/00617* (2013.01); *G06K 9/00906* (2013.01); *G06K 9/6256* (2013.01); *G06T 5/002* (2013.01); *G06T 2207/30201* (2013.01)

(56) References Cited

U.S. PATENT DOCUMENTS

| | | |
|---|---|---|
| 2015/0347841 A1 | 12/2015 | Mears |
| 2016/0117544 A1 | 4/2016 | Hoyos et al. |
| 2018/0268215 A1* | 9/2018 | Ovsiannikov ...... G06K 9/00617 |

FOREIGN PATENT DOCUMENTS

| | | |
|---|---|---|
| CN | 104301633 | 1/2015 |
| CN | 105139006 | 12/2015 |
| CN | 105184277 | 12/2015 |
| CN | 105718863 | 6/2016 |
| CN | 105718922 | 6/2016 |
| CN | 105913013 | 8/2016 |
| CN | 107506696 | 12/2017 |

OTHER PUBLICATIONS

SIPO, Fourth Office Action for CN Application No. 201710634311.7, dated Mar. 2, 2020.
EPO, Office Action for EP Application No. 18841541.8, dated Jun. 15, 2020.
SIPO, Fifth Office Action for CN Application No. 201710634311.7, dated May 11, 2020.
SIPO, Sixth Office Action for CN Application No. 201710634311.7, dated Jul. 22, 2020.
Moi et al., "Multimodal biometrics: Weighted score level fusion based on non-ideal iris and face images," Expert Systems with Applications, Mar. 2014, 15 pages.
WIPO, ISR for PCT/CN2018/096829, Oct. 17, 2018.
SIPO, First Office Action for CN Application No. 201710634311.7, dated May 8, 2019.
SIPO, Second Office Action for CN Application No. 201710634311.7, dated Jul. 2, 2019.
SIPO, Decision of Rejection for CN Application No. 201710634311.7, dated Oct. 10, 2020.

* cited by examiner

ANTI-COUNTERFEITING PROCESSING METHOD AND RELATED PRODUCTS

CROSS-REFERENCE TO RELATED APPLICATION APPLICATIONS

This application is a U.S. national phase application of International Application No. PCT/CN2018/096829, filed Jul. 24, 2018, which claims priority to Chinese Patent Application No. 201710634311.7, filed Jul. 29, 2017, the entire disclosures of which are incorporated herein by reference.

TECHNICAL FIELD

The present application relates to the field of electronic device technologies, and more particular, to an anti-counterfeiting processing method and related products.

BACKGROUND

With the widespread use of electronic devices such as mobile phones, tablets, and the like, more and more applications can be supported by the electronic devices, and thereby their functions are becoming more and more powerful. Electronic devices are developing in a diversified and personalized way and becoming indispensable for users.

At present, multi-biometric recognition is increasingly favored by electronic device manufacturers, especially iris recognition and face recognition. Since the iris is part of the face, the use of the iris and the face is also a major trend in the future. Although the safety of multi-biometric can be increased to a certain extent, in the process of multi-biometric recognition, it is possible to identify multiple illegal creatures if they are identified by forged faces or irises. Therefore, how to perform anti-counterfeiting of multi-biometric needs to be solved.

SUMMARY

An embodiment of the application provides an anti-counterfeiting processing method, which can perform anti-counterfeiting to improve the security of multi-biometric recognition.

In a first aspect, embodiments of the present application provide an electronic device, including an application processor, an iris recognition device, a face recognition device, and a memory. Wherein the iris recognition device, the face recognition device, and the memory are connected to the application processor.

The iris recognition device is configured to acquire an iris image.

The face recognition device is configured to acquire a plurality of face images, the plurality of face images each corresponds to a set of depth information and a respective angle, and the iris image and the plurality of face images are derived from the same target object.

The memory is configured to store a preset stereo face image.

The application processor is configured to perform three-dimensional modeling on the plurality of face images and the corresponding depth information and thereby to form a stereo face image, match the stereo face image with the preset stereo face image, perform a living body detection according to the iris image, and determine the target object is an effective real face when the stereo face image is successfully matched with the preset stereo face image and the iris image is derived from a living body.

In a second aspect, embodiments of the present application provide an anti-counterfeiting processing method. Wherein the method is applied to an electronic device, the electronic device includes an application processor, an iris recognition device, a face recognition device, and a memory. The iris recognition device, the face recognition device, and the memory are connected to the application processor, and the memory is configured to store a preset stereo face image. The method includes:

the iris recognition device acquiring an iris image;

the face recognition device acquiring a plurality of face images, the plurality of face images each corresponds to a set of depth information and a respective angle, and the iris image and the plurality of face images are derived from the same target object; and the application processor performing three-dimensional modeling on the plurality of face images and the corresponding depth information and thereby to form a stereo face image, matching the stereo face image with the preset stereo face image, performing a living body detection according to the iris image, and determining the target object is an effective real face when the stereo face image is successfully matched with the preset stereo face image and the iris image is derived from a living body.

In a third aspect, embodiments of the present application provide an anti-counterfeiting processing method. The method includes:

acquiring an iris image;

acquiring a plurality of face images, the plurality of face images each corresponds to a set of depth information and a respective angle, and the iris image and the plurality of face images are derived from the same target object;

performing three-dimensional modeling according to the plurality of face images and the depth information corresponding to the plurality of face images to obtain a stereo face image;

matching the stereo face image with a preset stereo face image, and performing a living body detection according to the iris image; and determining the target object is an effective real face when the stereo face image is successfully matched with the preset stereo face image and the iris image is derived from a living body.

In a fourth aspect, embodiments of the present application provide an anti-counterfeiting processing device. The device includes:

a first acquiring unit, configured to acquire an iris image;

a second acquiring unit, configured to acquire a plurality of face images, the plurality of face images each corresponds to a set of depth information and a respective angle, and the iris image and the plurality of face images are derived from the same target object;

a modeling unit, configured to perform three-dimensional modeling on the plurality of face images and the corresponding depth information and thereby to form a stereo face image;

a detecting unit, configured to match the stereo face image with a preset stereo face image, and perform a living body detection according to the iris image; and a first determining unit, configured to determine the target object is an effective real face when the stereo face image is successfully matched with the preset stereo face image and the iris image is derived from a living body.

In a fifth aspect, embodiments of the present application provide an electronic device, including an application processor, a memory and one or more computer programs. Wherein the one or more computer programs are stored in the memory and are configured to be executed by the application processor, and the computer programs include instructions for some or all of the steps as described in the third aspect.

In a sixth aspect, embodiments of the present application provide a computer readable storage medium, with computer programs stored therein. Wherein the computer program makes a computer to perform instructions for some or all of the steps as described in the third aspect.

In a seventh aspect, embodiments of the present application provide a computer program product, including a non-transitory computer readable storage medium with a computer program stored therein. Wherein the computer program being operative to make a computer to perform some or all of the steps as described in the third aspect. The computer program product can be a software installation package.

The implementation of the embodiments of the present application has the following beneficial effects:

It can be seen that, in embodiments of the present application, the electronic device can acquire an iris image and acquire a plurality of face images, the plurality of face images each corresponds to a set of depth information and a respective angle, and the iris image and the plurality of face images are derived from the same target object. The electronic device can perform three-dimensional modeling according to the plurality of face images and the depth information corresponding to the plurality of face images to obtain a stereo face image, match the stereo face image with a preset stereo face image, perform a living body detection according to the iris image, and determine the target object is an effective real face when the stereo face image is successfully matched with the preset stereo face image and the iris image is derived from a living body. Therefore, the stereo face image can be obtained by modeling with a plurality of face images corresponding to different angles. The stereo face image is matched, and the living body detection is performed according to the iris image. When the stereo face image is successfully matched and the iris image is derived from a living body, it indicates that the target object is from an effective real face, realizing anti-counterfeiting and improving the security of multi-biometric recognition.

BRIEF DESCRIPTION OF THE DRAWINGS

In order to more clearly illustrate the embodiments of the application or the technical solutions in the related art, the drawings to be used in the embodiments or the related art are briefly described below. Obviously, the following drawings are just for certain embodiments of the application, and other drawings can be obtained according to these drawings without any creative effort for those skilled in the art.

DETAILED DESCRIPTION

In order to enable a person skilled in the art to better understand the solution of the present application, the technical solutions in the embodiments of the present application are clearly and completely described in the following with reference to the accompanying drawings in the embodiments of the present application. It is apparent that the described embodiments are only a part of the embodiments of the present application, and not all of them. All other embodiments obtained by a person of ordinary skill in the art based on the embodiments of the present application without departing from the inventive scope are the scope of the present application.

The terms "first", "second" and the like in the specification and claims of the present application and the above drawings are used to distinguish different objects, and are not intended to describe a specific order. Furthermore, the terms "comprise", "include" and any variants thereof are intended to cover a non-exclusive inclusion. For example, a process, method, system, product, or device that includes a series of steps or units is not limited to the listed steps or units, but optionally also includes steps or units not listed, or alternatively includes other steps or units inherent to these processes, methods, products, or equipment.

References to "an embodiment" herein mean that a particular feature, structure, or characteristic described in connection with the embodiment can be included in at least one embodiment of the present application. The appearances of the phrases in various places in the specification are not necessarily referring to the same embodiments, and are not exclusive or alternative embodiments that are mutually exclusive. Those skilled in the art will understand and implicitly understand that the embodiments described herein can be combined with other embodiments.

The electronic device involved in the embodiments of the present application may include various handheld devices having wireless communication functions, in-vehicle devices, wearable devices, computing devices, or other processing devices connected to the wireless modem, and various forms of user equipment, mobile station, terminal device, etc. For convenience of description, the devices mentioned above are collectively referred to as electronic devices.

It should be noted that the electronic device in the embodiment of the present application may be installed with multi-biometric devices, that is, a plurality of biometric devices. The plurality of biometric devices may include, but are not limited to, a fingerprint recognition device, a face recognition device, a vein recognition device, an electroencephalogram recognition device, an electrocardiogram recognition device, and the like, in addition to the iris recognition device. Each biometric device has a corresponding recognition algorithm and a recognition threshold. In addition, each biometric device has a template corresponding thereto and pre-recorded by the user. For example, the fingerprint recognition device has a preset fingerprint template corresponding thereto. Further, the fingerprint recognition device may collect the fingerprint image, and when the matching value between the fingerprint image and the preset fingerprint template is greater than the corresponding recognition threshold, the recognition is passed. The iris image in the embodiment of the present application may be an image referring only to the iris region, or an image including the iris region (for example, a human eye image). For example, when the user uses the electronic device, the iris image can be acquired by the iris recognition device.

Further, the multi-biometric recognition mode in the embodiments of the present application may include two or more recognition steps, for example, fingerprint recognition, face recognition after fingerprint recognition passed, or fingerprint recognition and face recognition performed simultaneously. The multi-biometric recognition mode is more secure than single-biometric recognition mode (for example, unlocking only by fingerprint recognition), and thus, multi-biometric recognition modes are becoming more and more popular.

The embodiments of the present application are described in detail below. An exemplary electronic device 1000 is showed in FIG. 1A. The iris recognition device of the electronic device 1000 may include an infrared fill light 21 and an infrared camera 22. During the operation of the iris recognition device, after the light of the infrared fill light 21 is irradiated into the iris, it is reflected back to the infrared camera 22 by the iris, and the iris recognition device collects the iris image. A front camera 23 can be used as a face recognition device, and the front camera 23 can be a dual camera module.

Figure 1A:
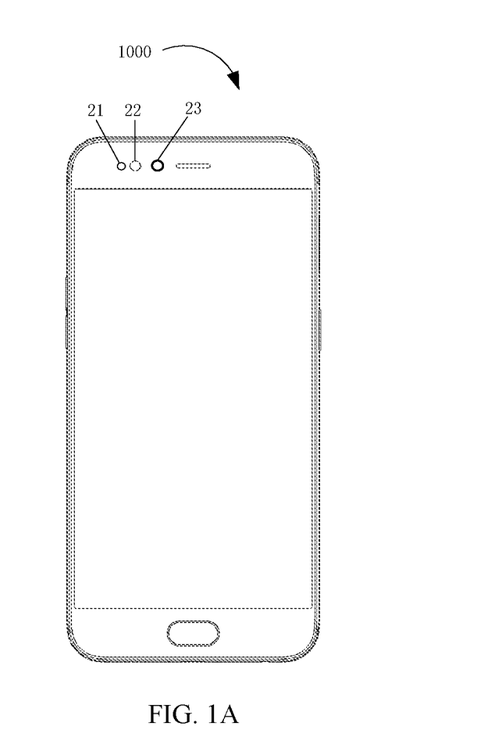
FIG. 1A is a schematic structural view of an electronic device according to an embodiment of the present application.
Figure 1B:
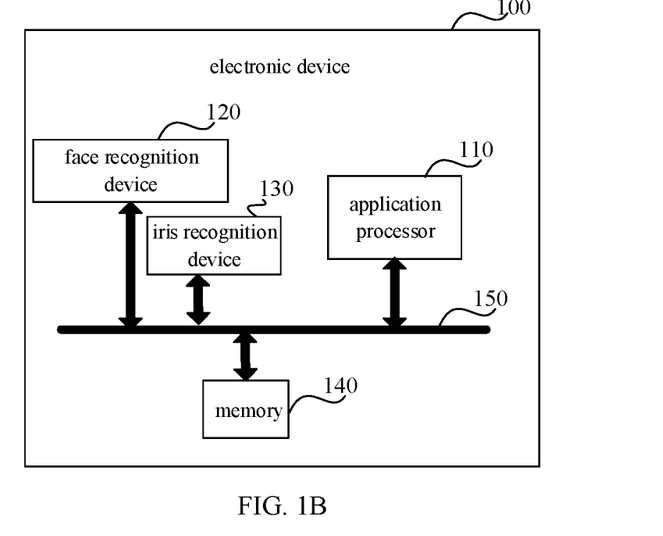
FIG. 1B is a schematic structural view of an electronic device according to an embodiment of the present application.
Figure 1C:
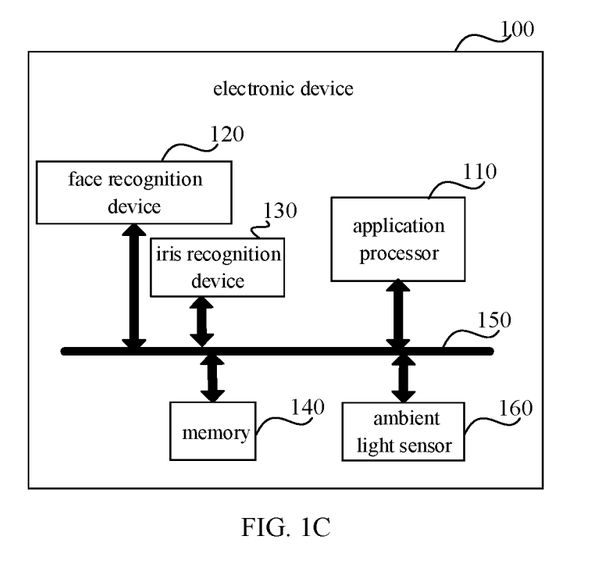
FIG. 1C is another schematic structural view of an electronic device according to an embodiment of present application.

FIG. 1B is a schematic structural view of an electronic device 100. The electronic device 100 can include an application processor AP 110, a face recognition device 120, an iris recognition device 130, and a memory 140. The iris recognition device 130 may be integrated with the face recognition device 120, or the iris recognition device 130 and the face recognition device 120 may exist independently. The AP 110 is connected to the face recognition device 120, the iris recognition device 130 and the memory 140 via the bus 150. Further, referring to FIG. 1C, which is a modified structure of the electronic device 100 in FIG. 1B. FIG. 1C also includes an ambient light sensor 160 with respect to FIG. 1B.

The electronic device described based on FIGS. 1A-1C can be used to perform the operations described below.

Optionally, the iris recognition device 130 is configured to acquire the iris image.

The face recognition device 120 is configured to acquire a plurality of face images. The plurality of face images each corresponds to a set of depth information and a respective angle, each human face image has a different angle. The iris image and the plurality of face images are derived from the same target object.

The memory 140 is configured to store a preset stereo face image.

The application processor 110 is configured to perform three-dimensional modeling on the plurality of face images and the corresponding depth information, thereby to form a stereo face image. The application processor 110 is configured to match the stereo face image with the preset stereo face image, perform a living body detection according to the iris image, and determine the target object is an effective real face when the stereo face image is successfully matched with the preset stereo face image and the iris image is derived from a living body.

Optionally, in the aspect of performing three-dimensional modeling on the plurality of face images and the corresponding depth information and thereby to form a stereo face image, the application processor 110 is specifically configured to:
  perform three-dimensional transformation on the plurality of face images and corresponding depth information to obtain a plurality of three-dimensional face images;
  perform size adjustment on the plurality of three-dimensional face images and thereby to ensure the adjusted face images with the same size; and
  splice the plurality of three-dimensional face images being adjusted to obtain the stereo face image.

Optionally, in the aspect of splicing the plurality of three-dimensional face images being adjusted, the application processor 110 is configured to:
  number the plurality of three-dimensional face images being adjusted in descending order of the angles of the plurality of three-dimensional face image, to obtain a plurality of numbers; and
  splice the adjusted plurality of three-dimensional face images according to the order of the numbers.

Optionally, in the aspect of performing a living body detection according to the iris image, the application processor 110 is configured to:
  perform feature extraction on the iris image to obtain P feature points, wherein the P is an integer greater than 1;
  train the P feature points by a preset classifier to obtain P training values;
  select training values greater than a preset training threshold from the P training values, to obtain Q training values, and determine that the iris image is derived from a living body when the ratio of Q to P is greater than a preset threshold. Wherein Q is a positive integer smaller than P.

Optionally, the electronic device is provided with the ambient light sensor 160, and the ambient light sensor 160 is configured to acquire a current ambient brightness value.

The application processor 110 is further configured to determine an image enhancement coefficient corresponding to the current ambient brightness value.

In the aspect of performing feature extraction on the iris image, the application processor is specifically configured to:
  perform image enhancement processing on the iris image according to the image enhancement coefficient, and perform feature extraction on the iris image after image enhancement processing.

Optionally, in the aspect of performing feature extraction on the iris image, the application processor is specifically configured to:

perform binarization processing on the iris image;
smooth the iris image after binarization processing; and
perform feature extraction on the smoothed iris image.

The electronic device described based on FIG. 1A-FIG. 1C can be used to perform the anti-counterfeiting processing method described below. The memory is configured to store the preset stereo face image. Details as follows.

The iris recognition device 130 acquires the iris image;

The face recognition device 120 acquires a plurality of face images. The plurality of face images each corresponds to a set of depth information and a respective angle, and the iris image and the plurality of face images are derived from the same target object.

The application processor performs three-dimensional modeling on the plurality of face images and the corresponding depth information and thereby to form a stereo face image, matches the stereo face image with the preset stereo face image, performs a living body detection according to the iris image, and determines the target object is an effective real face when the stereo face image is successfully matched with the preset stereo face image and the iris image is derived from a living body.

It can be seen that, in embodiments of the present application, the electronic device can acquire an iris image and acquire a plurality of face images, the plurality of face images each corresponds to a set of depth information and a respective angle, and the iris image and the plurality of face images are derived from the same target object. The electronic device can perform three-dimensional modeling according to the plurality of face images and the depth information corresponding to the plurality of face images to obtain a stereo face image, match the stereo face image with a preset stereo face image, perform a living body detection according to the iris image; and determine the target object is an effective real face when the stereo face image is successfully matched with the preset stereo face image and the iris image is derived from a living body. Therefore, the stereo face image can be obtained by modeling with a plurality of face images corresponding to different angles. The stereo face image is matched, and the living body detection is performed according the iris image. When the stereo face image is successfully matched and the iris image is derived from a living body, it indicates that the target object is from an effective real face, realizing anti-counterfeiting and improving the security of multi-biometric recognition.

Figure 1D:
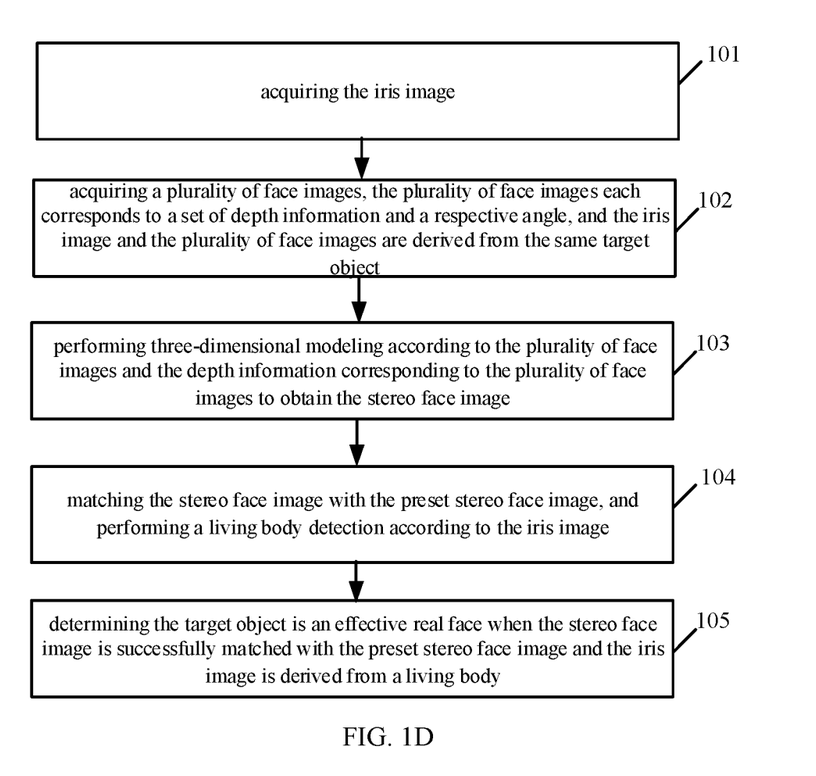
FIG. 1D is a schematic flowchart view of an anti-counterfeiting processing method according to an embodiment of the present application.

FIG. 1D is a schematic flowchart view of the anti-counterfeiting processing method according to embodiments of the present application. The anti-counterfeiting processing method described in embodiments is applied to the electronic device. The physical view and the structural view of the electronic device can be seen in FIG. 1A to FIG. 1C. The method includes the following steps:

101. acquiring the iris image.

Wherein, the iris image in the embodiment of the present application may be an image referring only to the iris region, or an image including the iris region (for example, a human eye image). For example, when the user uses the electronic device, the iris image can be acquired by the iris recognition device.

102. acquiring a plurality of face images, the plurality of face images each corresponds to a set of depth information and a respective angle, and the iris image and the plurality of face images are derived from the same target object.

Wherein, the electronic device can acquire a plurality of face images through the face recognition device. Each face image can be corresponding to an angle, and different face images correspond to different angles. Each face image can be corresponding to a set of depth information. The iris image and the plurality of face images are derived from the same target object. The target object can be a face, or a person, or an active object.

103. performing three-dimensional modeling according to the plurality of face images and the depth information corresponding to the plurality of face images to obtain the stereo face image.

Wherein, for a real face, it is a three-dimensional object, and a photo is two-dimensional. There are essential differences between 3D and 2D. From different dimensions, the depth information of different angles of 3D images is different, while the 2D images have smaller differences in depth information, or the depth information has a linear relationship. Thus, based on this, the electronic device can perform three-dimensional modeling based on the plurality of face images and depth information corresponding to the plurality of face images. Specifically, since the face image is corresponding to the depth information, each face image can be directly used as two-dimensional information, and the depth information corresponding to the face image is added to form three-dimensional information to obtain a three-dimensional stereo face image. The stereo face image can be synthesized from a plurality of three-dimensional stereo face images.

Optionally, the above step 103 of performing three-dimensional modeling according to the plurality of face images and the depth information corresponding to the plurality of face images to obtain a stereo face image includes steps 31-33. Details as follows:

31. the electronic device performs three-dimensional transformation on the plurality of face images and corresponding depth information, to obtain a plurality of three-dimensional face images.

32. the electronic device performs size adjustment on the plurality of three-dimensional face images and thereby to ensure the face images being adjusted with the same size.

33. the electronic device splices the plurality of three-dimensional face images being adjusted to obtain the stereo face image.

Wherein, the electronic device can perform three-dimensional transformation on each face images and corresponding depth information, to obtain a three-dimensional face image. Thereby, a plurality of three-dimensional face images can be obtained for a plurality of face images. Since the size of the face image taken at different angles is different, the size of the plurality of three-dimensional face images may be different. Further, the electronic device can perform size adjustment on the plurality of three-dimensional face images and thereby to ensure the face images being adjusted with the same size. In this way, the plurality of three-dimensional face images being adjusted can be spliced to obtain the stereo face image.

Further, optionally, the above step 33 of splicing the plurality of three-dimensional face images being adjusted to obtain the stereo face image includes steps 331-332, as follows:

331. numbering the plurality of three-dimensional face images being adjusted in descending order of the angles of the plurality of three-dimensional face image, to obtain a plurality of numbers;

332. splicing the adjusted plurality of three-dimensional face images according to the order of the numbers.

Wherein, the angle corresponding to each three-dimensional face image is large or small. Therefore, the plurality of three-dimensional face images being adjusted can be numbered in descending order of the angles of the plurality of three-dimensional face image, to obtain a plurality of numbers. The plurality of three-dimensional face images being adjusted can be spiced according to the order of the numbers, to obtain the stereo face image.

104. matching the stereo face image with the preset stereo face image, and performing a living body detection according to the iris image.

The preset stereo face image may be stored in advance in the memory, and may be a stereoscopic face image of the owner or other pre-stored stereo face images. The electronic device can match the stereo face image with the preset stereo face image, for example, the electronic device can perform feature extraction on the stereo face image to obtain a first feature point set, perform feature extraction on the preset stereo face image to obtain a second feature point set, match the first feature point set with the second feature point set to obtain a matching value, and determine that the stereo face image is successfully matched with the preset stereo face image when the matching value is greater than a preset matching threshold. In the embodiments of the present application, it is also necessary to performing a living body detection according to the iris image, which can be referred to the following detailed description.

Optionally, the matching the stereo face image with the preset stereo face image and the performing a living body detection according to the iris image can be performed in parallel. For example, the step of matching the stereo face image with the preset stereo face image is performed using one process, and the step of performing a living body detection according to the iris image is performed using another process. For another example, the step of matching the stereo face image with the preset stereo face image is performed by one thread, and the step of performing a living body detection according to the iris image is performed by another thread.

Optionally, the above step 104 of performing a living body detection according to the iris image includes steps 41-43, as follows:

41. performing feature extraction on the iris image to obtain P feature points, wherein the P is an integer greater than 1;

42. training the P feature points by a preset classifier to obtain P training values;

43. selecting training values that is greater than a preset training threshold from the P training values, to obtain Q training values, and determining that the iris image is derived from a living body when the ratio of Q to P is greater than a preset threshold, wherein Q is a positive integer smaller than P.

Wherein, the electronic device can perform feature extraction on the iris image to obtain P feature points, the P is an integer greater than 1. The above feature extraction can be implemented by using an algorithm such as a Harris corner detection algorithm, a scale invariant feature transform (SIFT), a SUSAN corner detection algorithm, and the like, and details are not described herein. The above preset classifier may include, but is not limited to, a support vector machine (SVM), a genetic algorithm classifier, a neural network algorithm classifier, a cascade classifier (such as genetic algorithm+SVM), and the like. The P feature points can be train by the preset classifier to obtain P training values. Training values that is greater than the preset training threshold can be selected from the P training values, to obtain Q training values. It is determined that the iris image is derived from a living body when the ratio of Q to P is greater than a preset threshold, wherein Q is a positive integer smaller than P. The preset training threshold and the preset threshold can be set by the user, or the system default.

The preset classifier may be configured before the implementation of the foregoing embodiment of the present application, and the main settings may include the following steps A1-A7:

A1. obtaining a positive sample set, the positive sample set includes feature points of X living iris images, wherein the X is a positive integer;

A2. obtaining a negative sample set, the negative sample set includes feature points of Y non-living iris images, wherein the Y is a positive integer;

A3. performing feature extraction on the positive sample set to obtain X sets of features;

A4. performing feature extraction on the negative sample set to obtain Y sets of features;

A5. training the X sets of features by using a first specified classifier to obtain a first target classifier;

A6. training the Y sets of features by using a second specified classifier to obtain a second target classifier;

A7. using the first target classifier and the second target classifier as the preset classifier.

Wherein, X and Y can be set by user. The greater of X and Y, the better the classification effect of the classifier. The specific manner of feature extraction in A3 and A4 above is referred to the above feature extraction description. The first specified classifier and the second specified classifier may be the same classifier or different classifiers. Both the first specified classifier and the second specified classifier may include, but are not limited to, support vector machines, genetic algorithm classifiers, neural network algorithm classifiers, cascade classifiers (e.g., genetic algorithm+SVM), and the like.

Optionally, the electronic device can also be provided with the ambient light sensor. The electronic device can acquire the current ambient brightness value, determine the image enhancement coefficient corresponding to the current ambient brightness value. The step 41 of performing feature extraction on the iris image can be implemented as follows:

performing image enhancement processing on the iris image according to the image enhancement coefficient, and performing feature extraction on the iris image after image enhancement processing.

Wherein, the electronic device can pre-store a correspondence between brightness values and image enhancement coefficients. The electronic device can acquire the current ambient brightness value by using the ambient light sensor. The electronic device can determine the image enhancement coefficient corresponding to the current ambient brightness value according to the correspondence, perform image enhancement processing on the iris image according to the image enhancement coefficient, and perform feature extraction on the iris image after image enhancement processing. The image enhancement coefficient can be understood as a degree parameter that performs image enhancement processing on an image. For example, The image enhancement coefficient can be the gray scale stretching, which corresponds to a stretch coefficient; the wavelet transform, which corresponds to a wavelet coefficient; or the histogram equalization also corresponding to a stretch coefficient and so on.

optionally, the above step 41 of performing feature extraction on the iris image may include steps 441-443, as follows:

441. performing binarization processing on the iris image;

442. smoothing the iris image after binarization processing; and 443. performing feature extraction on the smoothed iris image.

Wherein, the electronic device can perform binarization processing on the iris image to reduce the image complexity, further, smooth the iris image, and perform feature extraction on the smoothed iris image.

105. determining the target object is an effective real face when the stereo face image is successfully matched with the preset stereo face image and the iris image is derived from a living body.

Wherein, when the stereo face image is successfully matched with the preset stereo face image and the iris image is derived from a living body, the target object can be determined as an effective real face. The effective real face here can be considered as a human face with a life feature, not a photo, or a plastic model.

Optionally, when the stereo face image fails to match the preset stereo face image or the iris image is derived from a living body, it is confirmed that the target object is not an effective real face.

For example, there may be a forged face (for example, a plastic model) or a forged iris (for example, an iris photo). With the embodiment of the present application, the preset stereo face image may be pre-stored in the electronic device. After collecting the plurality of face images and the iris image for the target object, on the one hand, modeling may be performed according to the plurality of face images to obtain the stereo face image and matching the stereo face image with the preset stereo face image; on the other hand, the living body detection can be performed according to the iris image. When the stereo face image is successfully matched with the preset stereo face image and the iris is derived from the living body, the target object can be determined as the effective and real human face. In this way, the living body can be detected, and the face can be detected for anti-counterfeiting to a certain extent, and the anti-counterfeiting precision is improved. In the specific implementation, since the iris is also a part of the face, the convenience of positioning and image processing between the iris and the face reduces the complexity of the algorithm to some extent. Of course, even if the offender wears a human skin mask, or if a forged iris is made, it is difficult to pass the certification, thus improving the safety of multi-biometric recognition.

It can be seen that, in embodiments of the present application, the electronic device can acquire the iris image and acquire the plurality of face images, the plurality of face images each corresponds to a set of depth information and a respective angle, and the iris image and the plurality of face images are derived from the same target object. The electronic device can perform three-dimensional modeling according to the plurality of face images and the depth information corresponding to the plurality of face images to obtain a stereo face image, match the stereo face image with a preset stereo face image, perform a living body detection according to the iris image; and determine the target object is an effective real face when the stereo face image is successfully matched with the preset stereo face image and the iris image is derived from a living body. Therefore, the stereo face image can be obtained by modeling with a plurality of face images corresponding to different angles. The stereo face image is matched, and the living body detection is performed according the iris image. When the stereo face image is successfully matched and the iris image is derived from a living body, it indicates that the target object is from an effective real face, realizing anti-counterfeiting and improving the security of multi-biometric recognition.

Figure 2:
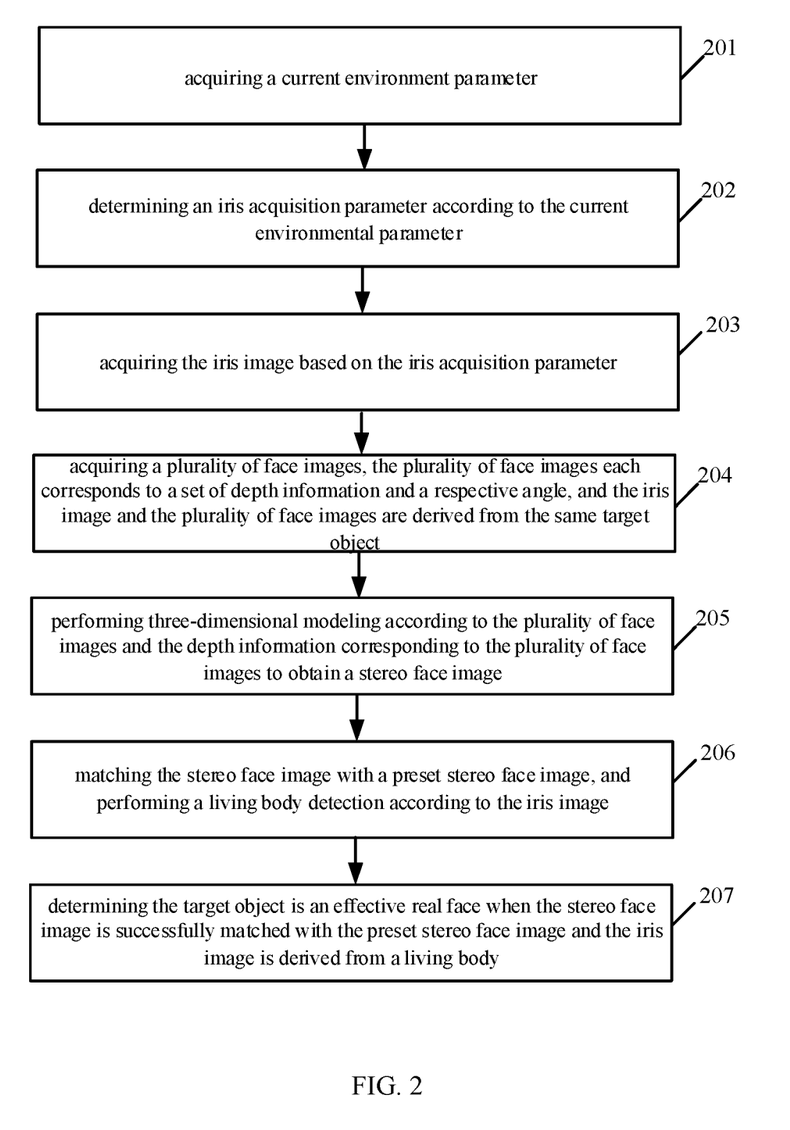
FIG. 2 is a schematic flowchart view of an anti-counterfeiting processing method according to another embodiment of the present application.

FIG. 2 is a schematic flowchart view of the anti-counterfeiting processing method according to embodiments of the present application. The anti-counterfeiting processing method described in this embodiments is applied to the electronic device. The physical view and the structural view of the electronic device can be seen in FIG. 1A to FIG. 1C. The method includes the following steps:

201. acquiring a current environment parameter.

Wherein, the environmental parameter may be at least one of the following: ambient brightness, weather, humidity, temperature, magnetic field interference intensity, environmental color, and the like. For example, the environment parameter can be obtained when an unlock operation is triggered. The ambient brightness can be detected by the ambient light sensor, the weather can be obtained by the weather application (APP), and the magnetic field interference intensity can be detected by the magnetic field detecting sensor, and the environment color can be obtained by the camera.

202. determining an iris acquisition parameter according to the current environmental parameter.

A correspondence between environment parameters and iris acquisition parameters can be pre-stored in the electronic device, so that the electronic device can determine the iris acquisition parameter corresponding to the current environment parameter according to the correspondence. The iris acquisition parameter may be at least one of acquisition voltage, acquisition current, acquisition power, fill light intensity, focus time, whether zoom is required, aperture size, exposure duration and the like.

203. acquiring the iris image based on the iris acquisition parameter.

Wherein, the electronic device can perform iris collection based on the iris acquisition parameter to obtain the iris image. Of course, the iris image is of higher quality due to optimization for a specific environment.

204. acquiring a plurality of face images, the plurality of face images each corresponds to a set of depth information and a respective angle, and the iris image and the plurality of face images are derived from the same target object.

205. performing three-dimensional modeling according to the plurality of face images and the depth information corresponding to the plurality of face images to obtain a stereo face image.

206. matching the stereo face image with a preset stereo face image, and performing a living body detection according to the iris image.

207. determining the target object is an effective real face when the stereo face image is successfully matched with the preset stereo face image and the iris image is derived from a living body.

Details of the foregoing steps 204 to 207 can refer to the anti-counterfeiting processing method described in FIG. 1D, and details are not described herein again.

It can be seen that, in embodiments of the present application, the electronic device can acquire the current environment parameter, determine the iris acquisition parameter according to the current environmental parameter, and acquire the iris image based on the iris acquisition parameter. The electronic device can acquire the plurality of face images, the plurality of face images each corresponds to a set of depth information and a respective angle, and the iris image and the plurality of face images are derived from the same target object. The electronic device can perform three-dimensional modeling according to the plurality of face images and the depth information corresponding to the plurality of face images to obtain a stereo face image, match the stereo face image with a preset stereo face image, perform a living body detection according to the iris image, and determine the target object is an effective real face when the stereo face image is successfully matched with the preset stereo face image and the iris image is derived from a living body. Therefore, the stereo face image can be obtained by modeling with a plurality of face images corresponding to different angles. The stereo face image is matched, and the living body detection is performed according the iris image. When the stereo face image is successfully matched and the iris image is derived from a living body, it indicates that the target object is from an effective real face, realizing anti-counterfeiting and improving the security of multi-biometric recognition.

Figure 3:
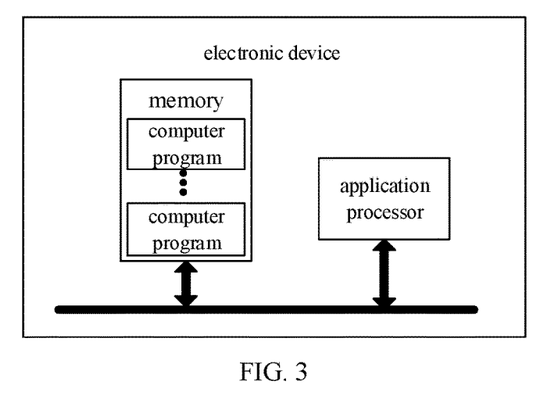
FIG. 3 is another schematic structural view of an electronic device according to an embodiment of present application.

FIG. 3 is a schematic structural view of the electronic device according to embodiments of present application. The electronic device includes the application processor, the memory and one or more computer programs. Wherein the one or more computer programs are stored in the memory and are configured to be executed by the application processor, and the computer programs include instructions for the following steps:

acquiring an iris image;

acquiring a plurality of face images, the plurality of face images each corresponding to a set of depth information and a respective angle, and the iris image and the plurality of face images are derived from the same target object;

performing three-dimensional modeling according to the plurality of face images and the depth information corresponding to the plurality of face images to obtain a stereo face image;

matching the stereo face image with a preset stereo face image, and performing a living body detection according to the iris image; and determining the target object is an effective real face when the stereo face image is successfully matched with the preset stereo face image and the iris image is derived from a living body.

In one possible embodiment, in the aspect of performing three-dimensional modeling according to the plurality of face images and the depth information corresponding to the plurality of face images to obtain a stereo face image, the computer programs include instructions for the following steps:

performing three-dimensional transformation on the plurality of face images and corresponding depth information, to obtain a plurality of three-dimensional face images;

performing size adjustment on the plurality of three-dimensional face images and thereby to ensure the face images being adjusted with the same size; and splicing the plurality of three-dimensional face images being adjusted to obtain the stereo face image.

In one possible embodiment, in the aspect of splicing the plurality of three-dimensional face images being adjusted, the computer programs include instructions for the following steps:

numbering the plurality of three-dimensional face images being adjusted in descending order of the angles of the plurality of three-dimensional face image, to obtain a plurality of numbers;

splicing the plurality of three-dimensional face images being adjusted according to the order of the numbers.

In one possible embodiment, in the aspect of performing a living body detection according to the iris image, the computer programs include instructions for the following steps:

performing feature extraction on the iris image to obtain P feature points, wherein the P is an integer greater than 1;

training the P feature points by a preset classifier to obtain P training values;

selecting training values that is greater than a preset training threshold from the P training values, to obtain Q training values, and determining that the iris image is derived from a living body when the ratio of Q to P is greater than a preset threshold, wherein Q is a positive integer smaller than P.

In one possible embodiment, the computer programs further include instructions for the following steps:

acquiring a current ambient brightness value, determining an image enhancement coefficient corresponding to the current ambient brightness value;

in the aspect of performing feature extraction on the iris image, the computer programs include instructions for the following steps:

performing image enhancement processing on the iris image according to the image enhancement coefficient, and performing feature extraction on the iris image after image enhancement processing.

In one possible embodiment, in the aspect of performing feature extraction on the iris image, the computer programs include instructions for the following steps:

performing binarization processing on the iris image;

smoothing the iris image after binarization processing; and performing feature extraction on the smoothed iris image.

Figure 4A:
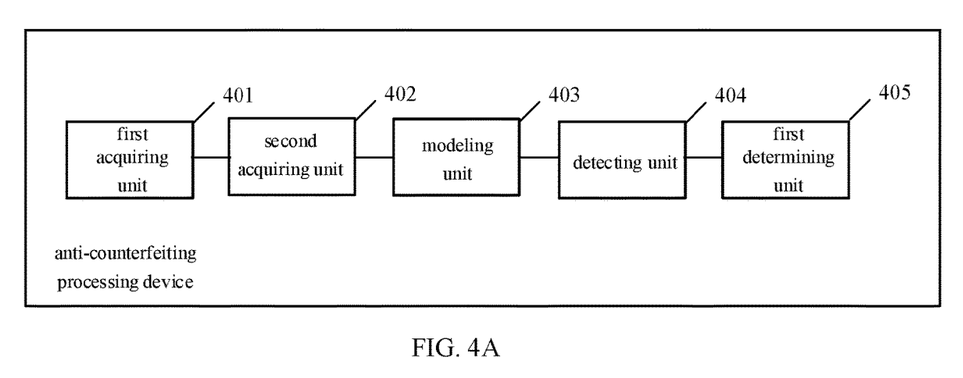
FIG. 4A is a schematic structural view of an anti-counterfeiting processing device according to an embodiment of the present application.

FIG. 4A is a schematic structural view of an anti-counterfeiting processing device according to embodiments of the present application. The anti-counterfeiting processing device is applied to the electronic device. The anti-counterfeiting processing device includes a first acquiring unit 401, a second acquiring unit 402, a modeling unit 403, a detecting unit 404 and a first determining unit 105.

The first acquiring unit 401 is configured to acquire the iris image.

The second acquiring unit 402 is configured to acquire the plurality of face images, the plurality of face images each corresponds to a set of depth information and a respective angle, and the iris image and the plurality of face images are derived from the same target object.

The modeling unit 403 is configured to perform three-dimensional modeling on the plurality of face images and the corresponding depth information and thereby to form a stereo face image.

The detecting unit 404 is configured to match the stereo face image with the preset stereo face image, and perform a living body detection according to the iris image.

The first determining unit 405 is configured to determine the target object is an effective real face when the stereo face image is successfully matched with the preset stereo face image and the iris image is derived from a living body.

Figure 4B:
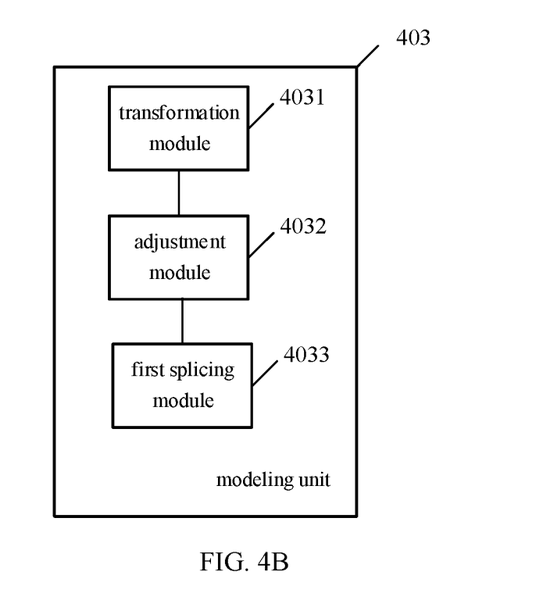
FIG. 4B is a schematic structural diagram of a modeling unit of the anti-counterfeiting processing device illustrated in FIG. 4A, according to an embodiment of the present application.

Optionally, as shown in FIG. 4B, FIG. 4B is a detailed structure view of the modeling unit 403 of the anti-counterfeiting processing device illustrated in FIG. 4A. The modeling unit 403 may include a transformation module 4031, an adjustment module 4032 and a first splicing module 4033.

The transformation module 4031 is configured perform three-dimensional transformation on the plurality of face images and corresponding depth information, to obtain a plurality of three-dimensional face images.

The adjustment module 4032 is configured to perform size adjustment on the plurality of three-dimensional face images and thereby to ensure the face images being adjusted with the same size.

The first splicing module 4033 is configured to splice the plurality of three-dimensional face images being adjusted to obtain the stereo face image.

Figure 4C:
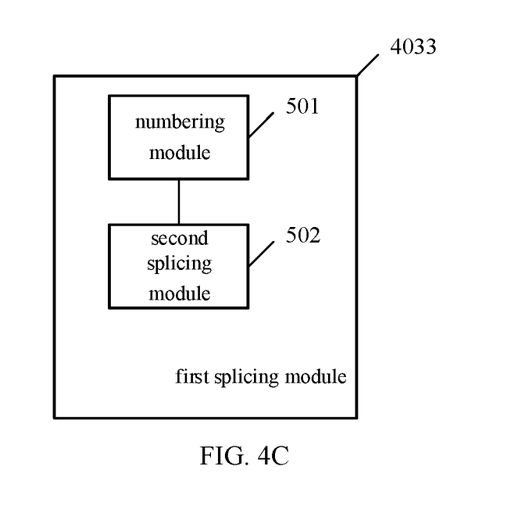
FIG. 4C is a schematic structural diagram of a first splicing module of the modeling unit illustrated in FIG. 4B, according to an embodiment of the present application.

Optionally, as shown in FIG. 4C, FIG. 4C is a detailed structure view of the first splicing module 4033 of the anti-counterfeiting processing device illustrated in FIG. 4A. The first splicing module 4033 may include a numbering module 501 and a second splicing module 502.

The numbering module 501 is configured to number the plurality of three-dimensional face images being adjusted in descending order of the angles of the plurality of three-dimensional face image, to obtain a plurality of numbers.

The second splicing module 502 is configured to splice the adjusted plurality of three-dimensional face images according to the order of the numbers.

Optionally, the embodiments of the modeling unit 403 performing a living body detection according to the iris image includes:

performing feature extraction on the iris image to obtain P feature points, wherein the P is an integer greater than 1;

training the P feature points by a preset classifier to obtain P training values;

selecting training values greater than a preset training threshold from the P training values, to obtain Q training values, and determining that the iris image is from a living body when the ratio of Q to P is greater than a preset threshold, wherein Q is a positive integer smaller than P.

Figure 4D:
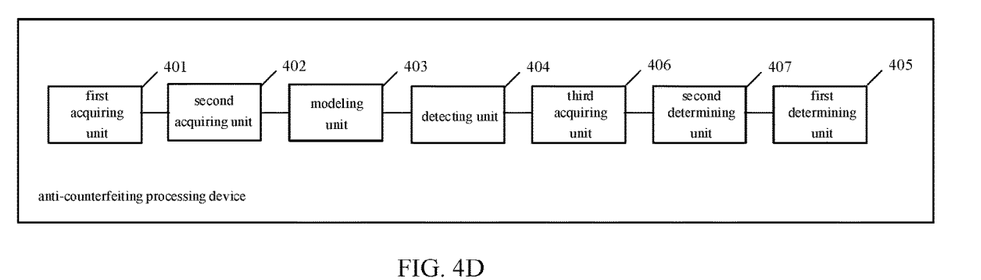
FIG. 4D is a schematic structural view of an anti-counterfeiting processing device according to another embodiment of the present application.

Optionally, as shown in FIG. 4D, FIG. 4D is a modified structure of the anti-counterfeiting processing device described in FIG. 4A. The anti-counterfeiting processing device may further include a third acquiring unit 406 and a second determining unit 407, as compared with FIG. 4A.

The third acquiring unit 406 is configured to acquire the current ambient brightness value.

The second determining unit 407 is configured to determine the image enhancement coefficient corresponding to the current ambient brightness value. The step of performing image enhancement processing on the iris image according to the image enhancement coefficient, and performing feature extraction on the iris image after image enhancement processing is performed by the detecting unit 404.

Optionally, the embodiments of the detecting unit 403 performing feature extraction on the iris image includes:

performing binarization processing on the iris image;

smoothing the iris image after binarization processing; and performing feature extraction on the smoothed iris image.

It can be seen that, the anti-counterfeiting processing device described in embodiments of the present application can acquire an iris image and acquire a plurality of face images, the plurality of face images each corresponds to a set of depth information and a respective angle, and the iris image and the plurality of face images are derived from the same target object. The anti-counterfeiting processing device can perform three-dimensional modeling according to the plurality of face images and the depth information corresponding to the plurality of face images to obtain a stereo face image, match the stereo face image with a preset stereo face image, perform a living body detection according to the iris image; and determine the target object is an effective real face when the stereo face image is successfully matched with the preset stereo face image and the iris image is derived from a living body. Therefore, the stereo face image can be obtained by modeling with a plurality of face images corresponding to different angles. The stereo face image is matched, and the living body detection is performed according the iris image. When the stereo face image is successfully matched and the iris image is derived from a living body, it indicates that the target object is from an effective real face, realizing anti-counterfeiting and improving the security of multi-biometric recognition.

It is to be understood that the functions of the program modules of the anti-counterfeiting processing device of the embodiment may be specifically implemented according to the method in the foregoing method embodiments. The specific implementation process of the anti-counterfeiting processing device can refer to the related description in the foregoing method embodiments, and details of the anti-counterfeiting processing device are not described herein again.

Figure 5:
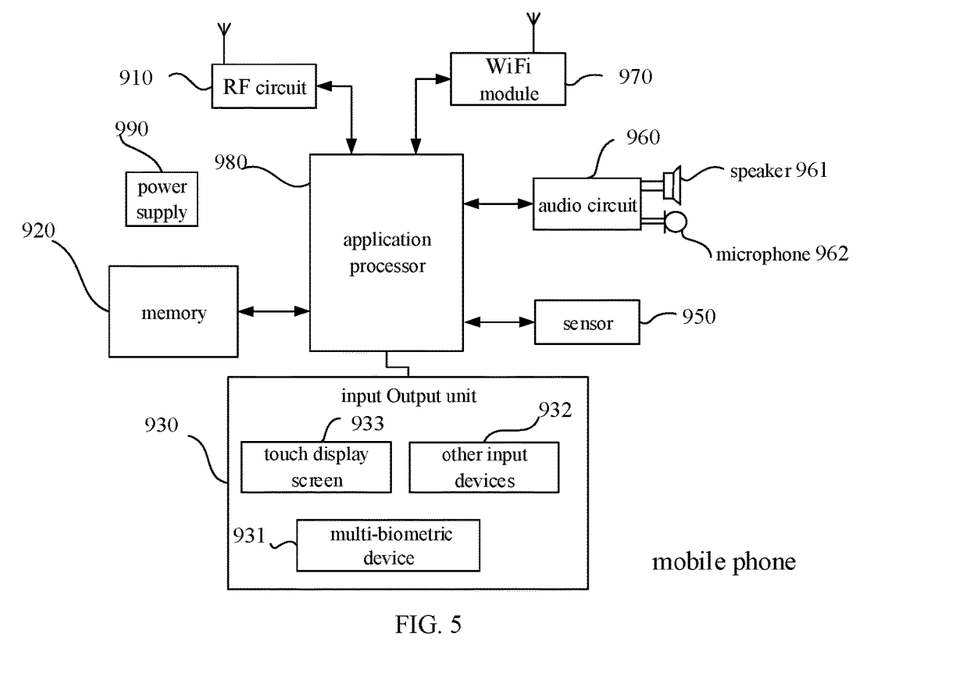
FIG. 5 is a schematic structural view of an electronic device according to another embodiment of the present application.

The embodiment of the present application further provides another electronic device, as shown in FIG. 5. For the convenience of description, only parts related to the embodiment of the present application are shown in FIG. 5, and the specific technical details not disclosed refer to the method of the present embodiment. The electronic device may be any terminal device including a mobile phone, a tablet computer, a PDA (personal digital assistant), a POS (point of sales), an in-vehicle computer, and the like, and the mobile phone is used as an example of the electronic device.

FIG. 5 is a block diagram showing a partial structure of a mobile phone related to an electronic device provided by embodiments of the present application. Referring to FIG. 5, the mobile phone includes a radio frequency (RF) circuit 910, a memory 920, an input unit 930, a sensor 950, an audio circuit 960, a wireless fidelity (WiFi) module 970, an application processor 980, and a power supply 990 and other components. It will be understood by those skilled in the art that the structure of the mobile phone shown in FIG. 5 is not a limitation to the mobile phone, and may include more or less components than those illustrated, or some components may be combined, or different components may be arranged.

The components of the mobile phone will be specifically described below with reference to FIG. 5.

The input unit 930 can be configured to receive numeric or character information that is input, and to generate key signal inputs related to user settings and function controls of the mobile phone. Specifically, the input unit 930 may include a touch display screen 933, a multi-biometric device 931, and other input devices 932. The specific structural of the multi-biometric device 931 can be referred to the above description, and will not be described here. The input unit 930 can also include other input devices 932. Specifically, the other input devices 932 may include, but are not limited to, one or more of physical buttons, function keys (such as volume control buttons, switch buttons, etc.), trackballs, mice, joysticks, and the like.

Wherein, the application processor 980 is configured to perform the following steps:

acquiring an iris image;

acquiring a plurality of face images, the plurality of face images each corresponding to a set of depth information and a respective angle, and the iris image and the plurality of face images are derived from the same target object;

performing three-dimensional modeling according to the plurality of face images and the depth information corresponding to the plurality of face images to obtain a stereo face image;

matching the stereo face image with a preset stereo face image, and performing a living body detection according to the iris image; and determining the target object is an effective real face when the stereo face image is successfully matched with the preset stereo face image and the iris image is derived from a living body.

The application processor 980 is the control center of the mobile phone, which utilizes various interfaces and lines to connect various portions of the mobile phone, and executes various functions and processing data of the mobile phone by running or executing software programs and/or modules stored in the memory 920, as well as calling data stored in the memory 920, to monitor the phone as a whole. Optionally, the application processor 980 may include one or more processing units, where the processing unit may be an artificial intelligence chip or a quantum chip. Preferably, the application processor 980 may integrate an application processor and a modem processor, where the application processor mainly processes the operating system, user interface, application, etc., and the modem processor mainly processes wireless communication. It can be understood that the above modem processor may not be integrated into the application processor 980.

Moreover, memory 920 can include high speed random access memory, and can also include non-volatile memory, such as at least one magnetic disk storage, flash memory, or other volatile solid state memory.

The RF circuit 910 can be used for transmitting and receiving messages. Generally, the RF circuitry 910 includes, but is not limited to, an antenna, at least one amplifier, a transceiver, a coupler, a low noise amplifier (LNA), a duplexer, and the like. In addition, the RF circuit 910 can also communicate with the network and other devices through wireless communication. The wireless communication may use any communication standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The mobile phone also can include at least one type of the sensor 950, such as a light sensor, a motion sensor, and other sensors. Specifically, the light sensor may include an ambient light sensor and a proximity sensor, wherein the ambient light sensor may adjust the brightness of the touch display according to the brightness of the ambient light, and the proximity sensor may close the touch display and/or the backlight when the mobile phone moves to the ear of the user. As a kind of motion sensor, a gravity acceleration sensor can detect the magnitude of acceleration in all directions (usually three axes). When it is stationary, it can detect the magnitude and direction of gravity. It can be used to identify the gesture of the mobile phone (such as horizontal and vertical screen switching, related games, magnetometer attitude calibrations), vibration recognition related functions (such as a pedometer, the tapping), etc. Other sensors such as gyroscopes, barometers, hygrometers, thermometers, infrared sensors, etc., also can be disposed in the mobile phone and are not detailed here.

The audio circuit 960, a speaker 961, and a microphone 962 can provide an audio interface between the user and the mobile phone. The audio circuit 960 can convert the received audio data into electrical signals and transmit the electrical signals to the speaker 961, the speaker 961 converts the electrical signals into sound signals and output the sound signals. On the other hand, the microphone 962 converts the collected sound signals into electrical signals, the electrical signals are received by the audio circuit 960 and then converted into audio data, the audio data is then processed by the AP 980, and then is sent to another terminal via the RF circuitry 910, or the audio data is output to the memory 920 for further processing.

WiFi is a short-range wireless transmission technology, and the mobile phone can help users to send and receive emails, browse web pages, and access streaming media through the WiFi module 970, which provides wireless broadband internet access for users. Although FIG. 5 shows the WiFi module 970, it can be understood that it is not the necessary configuration of the mobile phone, and may be omitted as needed within the scope of not changing the essence of the application.

The mobile phone also includes the power supply 990 (such as a battery) that supplies power to the various components. Optionally, the power supply 990 can be logically coupled to the AP 980 through a power management system to manage functions such as charging, discharging, and power management.

Although not shown, the mobile phone may further include a camera, a Bluetooth module, and the like, and details are not described herein again.

In the foregoing embodiments shown in FIG. 1D and FIG. 2, each step, method, or operation can be implemented based on the structure of the mobile phone.

In the foregoing embodiments shown in FIG. 3 and FIG. 4A to FIG. 4D, the function of each unit can be implemented based on the structure of the mobile phone.

The embodiment of the application further provides a computer storage medium, wherein the computer storage medium stores a computer program, the computer program enables the computer to execute a part of steps or all steps of any of the anti-counterfeiting processing method as described in the foregoing method embodiments.

The embodiment of the application further provides a computer program product, which includes a non-transitory computer readable storage medium storing a computer program, the computer program being executable to enable a computer to perform a part of steps or all steps of the anti-counterfeiting processing method recited in the foregoing method embodiments.

It should be noted that, for simple description, the foregoing method embodiments are all described as a series of operation combinations, but those skilled in the art should understand that the application is not limited by the described action sequence. Because certain steps may be performed in other sequences or concurrently, according to the embodiments of the application. Those skilled in the art should also understand that the embodiments described in the specification are all preferred embodiments, and the operations and modules involved are not necessarily by the application.

In the above embodiments, the description of every embodiment is different, and the details that are not described in a certain embodiment can be referred to the related descriptions of other embodiments.

In several embodiments of the application, it should be understood that the disclosed device may be implemented in other manners. The device embodiments described above are merely illustrative. For example, the division of the unit is only a logical function division. In actual implementation, there may be another division manner, such as multiple units or components may be combined or may be integrated into another system, or some features can be omitted or not executed. In addition, the mutual coupling or direct coupling or communication connection shown or discussed may be an indirect coupling or communicating connection through some interfaces, devices or units, and may be electrical or other ways.

The units described as separate components may be or may be not physically separated, and the components shown as units may be or may be not physical units, that is, the component may be located in one place, or may be distributed to several network units. Some or all of the units may be selected according to actual needs to achieve the purpose of the solution of the embodiment.

Each functional unit in the embodiment of the application may be integrated into one processing module, or each unit may exist physically separately, or two or more units may be integrated into one module. The above integrated modules can be implemented in the form of hardware or in the form of software functional modules.

The integrated modules, if implemented in the form of software functional modules and sold or used as stand-alone products, may also be stored in a computer readable storage medium. Based on such understanding, the technical solution of the application, in essence or the contribution to the prior art, or all or part of the technical solution may be embodied in the form of a software product. The software product is stored in a memory, and includes a number of instructions configured to enable a computer device (may be a personal computer, a server or a network device, etc.) to perform all or part of the steps of the methods described in the embodiments of the application. The foregoing memory includes a U disk, a read-only memory (ROM), a random access memory (RAM), a mobile hard disk, a magnetic disk, or an optical disk, and the like, that can store program codes.

A person skilled in the art can understand that all or part of the steps of the foregoing embodiments can be performed by a program to instruct related hardware, and the program can be stored in a computer readable memory, and the memory can include a flash drive, a ROM, a RAM, a disk or a CD.

The embodiments of the application have been described in detail above. The principle and implementation of the application are described in the specific examples. The description of the above embodiments is only used to help to understand the method and the spirit of the application. Those skilled in the art may modify the specific embodiments and the scope of the application according to the spirit of the application. In summary, the content of the specification should not be construed as limitations of the application.

What is claimed is:

1. An electronic device, comprising an application processor, an iris recognition device, a face recognition device, and a memory, wherein the iris recognition device, the face recognition device, and the memory are connected to the application processor,
the iris recognition device is configured to acquire an iris image;
the face recognition device is configured to acquire a plurality of face images, the plurality of face images each corresponds to a set of depth information and a respective angle, and the iris image and the plurality of face images are derived from a same target object;
the memory is configured to store a preset stereo face image; and
the application processor is configured to:
perform three-dimensional modeling on the plurality of face images and the corresponding depth information and thereby to form a stereo face image,
perform a living body detection according to the iris image, and
determine the target object is an effective real face when the stereo face image is matched with the preset stereo face image and the iris image is derived from a living body.

2. The electronic device of claim 1, wherein the application processor is configured to:
perform three-dimensional transformation on the plurality of face images and corresponding depth information to obtain a plurality of three-dimensional face images;
perform size adjustment on the plurality of three-dimensional face images and thereby to ensure the face images being adjusted with a same size; and
splice the plurality of three-dimensional face images being adjusted to obtain the stereo face image.

3. The electronic device of claim 1, wherein the application processor is configured to:
number the plurality of three-dimensional face images being adjusted in descending order of the angles of the plurality of three-dimensional face images, to obtain a plurality of numbers; and
splice the adjusted plurality of three-dimensional face images according to the order of the numbers.

4. The electronic device of claim 1, wherein the application processor is configured to:
perform feature extraction on the iris image to obtain P feature points, wherein P is an integer greater than 1;
train the P feature points by a preset classifier to obtain P training values;
select training values greater than a preset training threshold from the P training values, to obtain Q training values, and
determine that the iris image is derived from a living body when a ratio of Q to P is greater than a preset threshold, wherein Q is a positive integer smaller than P.

5. The electronic device of claim 4, wherein the electronic device is provided with an ambient light sensor, and the ambient light sensor is configured to acquire a current ambient brightness value;
the application processor is further configured to determine an image enhancement coefficient corresponding to the current ambient brightness value;
wherein the application processor is configured to:
perform image enhancement processing on the iris image according to the image enhancement coefficient, and
perform feature extraction on the iris image after image enhancement processing.

6. The electronic device of claim 4, wherein the application processor is configured to:
perform binarization processing on the iris image;
smooth the iris image after binarization processing; and
perform feature extraction on the smoothed iris image.

7. An anti-counterfeiting processing method, wherein the method is applied to an electronic device, the electronic device comprises an application processor, an iris recognition device, a face recognition device, and a memory, the iris recognition device, the face recognition device, and the memory are connected to the application processor, the memory is configured to store a preset stereo face image; the method comprises:

the iris recognition device acquiring an iris image;
the face recognition device acquiring a plurality of face images, the plurality of face images each corresponds to a set of depth information and a respective angle, and the iris image and the plurality of face images are derived from a same target object; and
the application processor performing three-dimensional modeling on the plurality of face images and the corresponding depth information and thereby to form a stereo face image, performing a living body detection according to the iris image, and determining the target object is an effective real face when the stereo face image is matched with the preset stereo face image and the iris image is derived from a living body.

8. An anti-counterfeiting processing method, comprising:
acquiring an iris image;
acquiring a plurality of face images, the plurality of face images each corresponding to a set of depth information and a respective angle, and the iris image and the plurality of face images are derived from a same target object;
performing three-dimensional modeling according to the plurality of face images and the depth information corresponding to the plurality of face images to obtain a stereo face image;
performing a living body detection according to the iris image; and
determining the target object is an effective real face when the stereo face image is matched with a preset stereo face image and the iris image is derived from a living body.

9. The method of claim 8, wherein the operation of performing three-dimensional modeling according to the plurality of face images and the depth information corresponding to the plurality of face images to obtain a stereo face image comprises:
performing three-dimensional transformation on the plurality of face images and corresponding depth information, to obtain a plurality of three-dimensional face images;
performing size adjustment on the plurality of three-dimensional face images and thereby to ensure the face images being adjusted with a same size; and
splicing the plurality of three-dimensional face images being adjusted to obtain the stereo face image.

10. The method of claim 9, wherein the operation of splicing the plurality of three-dimensional face images being adjusted comprises:
numbering the plurality of three-dimensional face images being adjusted in descending order of the angles of the plurality of three-dimensional face image, to obtain a plurality of numbers; and
splicing the plurality of three-dimensional face images being adjusted according to the order of the numbers.

11. The method of claim 8, wherein the operation of performing a living body detection according to the iris image comprises:
performing feature extraction on the iris image to obtain P feature points, wherein P is an integer greater than 1;
training the P feature points by a preset classifier to obtain P training values;
selecting training values that is greater than a preset training threshold from the P training values, to obtain Q training values, and
determining that the iris image is derived from a living body when a ratio of Q to P is greater than a preset threshold, wherein Q is a positive integer smaller than P.

12. The method of claim 11, further comprising:
acquiring a current ambient brightness value;
determining an image enhancement coefficient corresponding to the current ambient brightness value;
the operation of performing feature extraction on the iris image comprising:
performing image enhancement processing on the iris image according to the image enhancement coefficient, and performing feature extraction on the iris image after image enhancement processing.

13. The method of claim 11, wherein the operation of performing feature extraction on the iris image comprises:
performing binarization processing on the iris image;
smoothing the iris image after binarization processing; and
performing feature extraction on the smoothed iris image.

14. The method of claim 9, further comprising:
using each face image as two-dimensional information, adding depth information corresponding to the face image to form three-dimensional information, using the three-dimensional information as the three-dimensional face image corresponding to the face image.

15. The method of claim 8, wherein before the operation of determining the target object is an effective real face, the method further comprising:
performing feature extraction on the stereo face image to obtain a first feature point set;
performing feature extraction on the preset stereo face image to obtain a second feature point set;
comparing the first feature point set with the second feature point set to obtain a matching value; and
determining that the stereo face image is matched with the preset stereo face image, when the matching value is greater than a preset matching threshold.

16. The method of claim 11, further comprising:
obtaining a positive sample set, the positive sample set comprising feature points of X living iris images, wherein the X is a positive integer;
obtaining a negative sample set, the negative sample set comprising feature points of Y non-living iris images, wherein the Y is a positive integer;
performing feature extraction on the positive sample set to obtain X sets of features;
performing feature extraction on the negative sample set to obtain Y sets of features;
training the X sets of features by using a first specified classifier to obtain a first target classifier;
training the Y sets of features by using a second specified classifier to obtain a second target classifier; and
using the first target classifier and the second target classifier as the preset classifier.

17. The method of claim 12, wherein a correspondence between brightness values and image enhancement coefficients is pre-stored in an electronic device, and the method further comprises:
determining the image enhancement coefficient corresponding to the current ambient brightness value according to the correspondence.

18. The method of claim 8, further comprising:
acquiring a current environment parameter;
determining an iris acquisition parameter according to the current environment parameter; and
acquiring the iris image based on the iris acquisition parameter.

19. The method of claim 18, wherein a correspondence between environment parameters and iris acquisition parameters is pre-stored in an electronic device, the method further comprises:
determining the iris acquisition parameter corresponding to the current environment parameter according to the correspondence.

20. The method of claim 19, wherein the iris acquisition parameter comprises at least one of acquisition voltage, acquisition current, acquisition power, fill light intensity, focus time, zoom, aperture size, and exposure duration.

* * * * *